(12) United States Patent
Mosholder

(10) Patent No.: US 9,710,677 B1
(45) Date of Patent: Jul. 18, 2017

(54) TAMPER EVIDENT PORT PROTECTOR

(71) Applicant: The United States of America as represented by the Director, National Security Agency, Washington, DC (US)

(72) Inventor: Gary S. Mosholder, Sykesville, MD (US)

( * ) Notice: Subject to any disclaimer, the term of this patent is extended or adjusted under 35 U.S.C. 154(b) by 202 days.

(21) Appl. No.: 14/790,137

(22) Filed: Jul. 2, 2015

(51) Int. Cl.
| G06F 21/86 | (2013.01) |
| H01R 13/443 | (2006.01) |
| H05K 5/02 | (2006.01) |
| G06F 21/60 | (2013.01) |

(52) U.S. Cl.
CPC ............. *G06F 21/86* (2013.01); *G06F 21/60* (2013.01); *H01R 13/443* (2013.01); *H05K 5/0208* (2013.01)

(58) Field of Classification Search
CPC ....... G06F 21/86; G06F 21/60; H05K 5/0208; H01R 13/443
See application file for complete search history.

(56) References Cited

U.S. PATENT DOCUMENTS

| 5,642,805 | A | 7/1997 | Tefft |
| 6,796,152 | B1 | 9/2004 | Yu |
| 6,802,723 | B2 | 10/2004 | Decime et al. |
| 6,991,479 | B2 | 1/2006 | Miao |
| 7,083,438 | B2 | 8/2006 | Massaro et al. |
| 7,128,586 | B2 | 10/2006 | Kung |
| 7,160,137 | B1 | 1/2007 | Yeh |
| 7,223,574 | B2 | 5/2007 | Lei et al. |
| 7,275,941 | B1 | 10/2007 | Bushby |
| 7,390,201 | B1 | 6/2008 | Quinby et al. |
| 7,428,834 | B1 | 9/2008 | Lee |
| 7,462,045 | B1 | 12/2008 | Lee |
| 7,479,021 | B2 | 1/2009 | Huang |
| 7,530,824 | B2 | 5/2009 | Bolain |
| 7,563,113 | B2 | 7/2009 | Sheng |
| 7,581,417 | B1 | 9/2009 | Chen |
| 7,635,272 | B2 | 12/2009 | Poppe |
| 7,677,065 | B1 | 3/2010 | Miao |
| 7,722,369 | B2 | 5/2010 | Bushby |
| 7,794,245 | B2 | 9/2010 | Thompson |
| 7,913,527 | B2 | 3/2011 | Chen |
| 8,029,299 | B1 | 10/2011 | Huang |
| 8,142,212 | B2 | 3/2012 | McSweeney et al. |
| 8,414,314 | B1 * | 4/2013 | Mosholder ............. H01R 13/44 439/133 |
| 8,449,309 | B1 | 5/2013 | Mosholder |
| 2003/0224637 | A1 | 12/2003 | Ling |
| 2003/0228777 | A1 | 12/2003 | Lai |
| 2005/0039502 | A1 | 2/2005 | Avganim |
| 2005/0164548 | A1 | 7/2005 | Spears et al. |
| 2005/0202698 | A1 | 9/2005 | Miao |
| 2006/0107073 | A1 | 5/2006 | Lane et al. |
| 2006/0134952 | A1 | 6/2006 | Meister et al. |

(Continued)

*Primary Examiner* — Michael Pyzocha

(57) ABSTRACT

A port protector is provided by a base member that engages the port and a slidably mounted slide member. Locking members are provided on the base member and the slide member such that when the locking members are engage the slide member does not slide relative to the base member. Unlocking of the port protector is achieved by removing or perforating a tongue of the base. Removal of the tongue provides evidence that access to the port was achieved.

18 Claims, 20 Drawing Sheets

(56) References Cited

U.S. PATENT DOCUMENTS

| | | |
|---|---|---|
| 2006/0234533 A1 | 10/2006 | Lei et al. |
| 2007/0037454 A1 | 2/2007 | Bushby |
| 2007/0162655 A1* | 7/2007 | Huang ............... H01R 13/6397 |
| | | 710/36 |
| 2008/0041125 A1 | 2/2008 | Poppe |
| 2009/0042433 A1 | 2/2009 | Bushby |
| 2009/0117763 A1 | 5/2009 | Chen |
| 2010/0009565 A1 | 1/2010 | Wang |
| 2010/0033913 A1 | 2/2010 | Cao |
| 2012/0108088 A1 | 5/2012 | Peng et al. |
| 2012/0289069 A1 | 11/2012 | Chueh et al. |
| 2013/0029505 A1* | 1/2013 | Hackett ................ H01R 13/443 |
| | | 439/135 |
| 2016/0196454 A1* | 7/2016 | Soffer .................. H01R 4/4809 |
| | | 726/16 |

\* cited by examiner

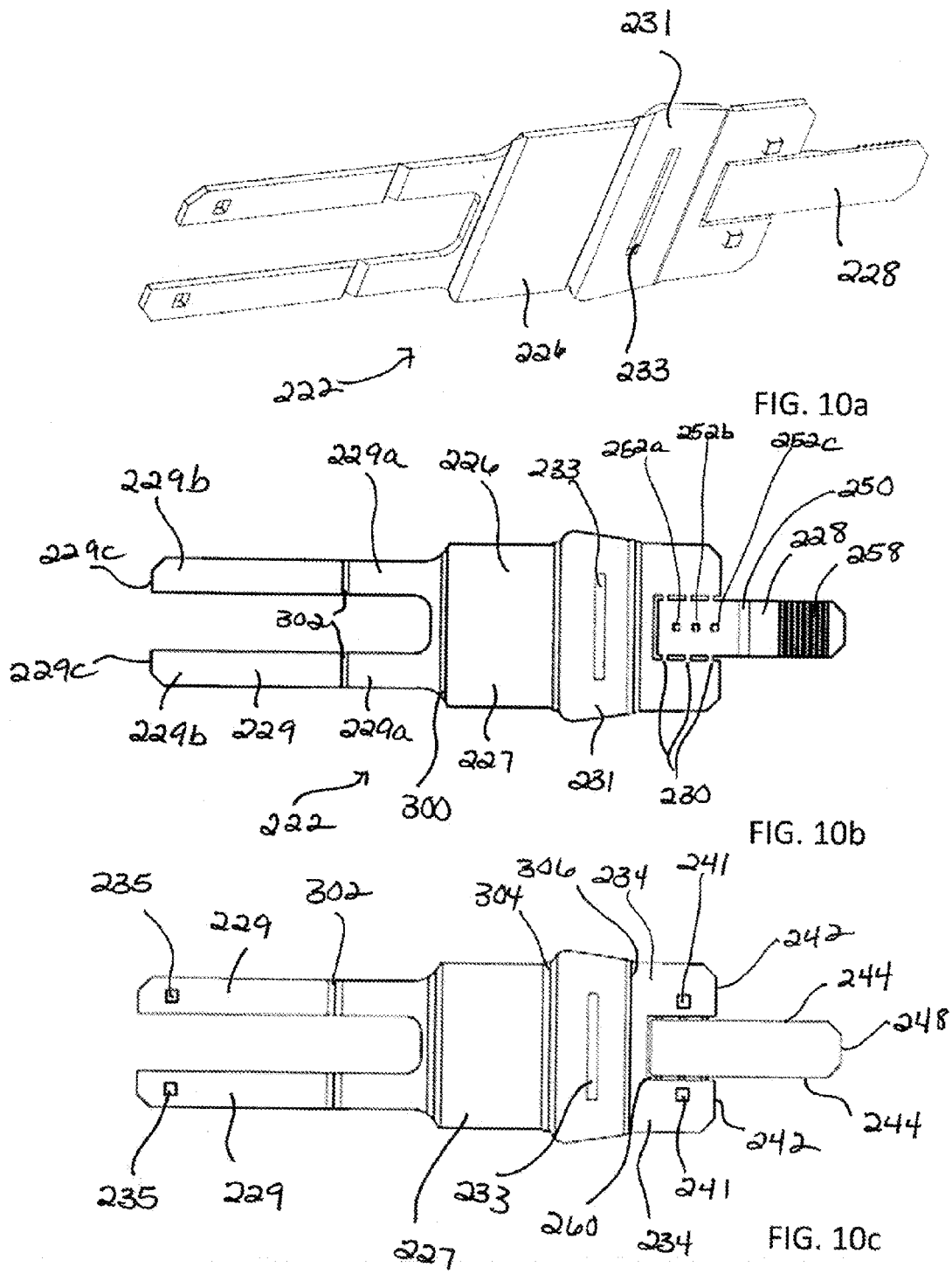

TAMPER EVIDENT PORT PROTECTOR

FIELD OF THE INVENTION

This invention is generally directed to tamper evident port protectors.

BACKGROUND OF THE INVENTION

Data ports such as, for example, USB, HDMI and other data ports on computers, communications equipment or on-board diagnostic ports in vehicle provide a convenient way for interfacing with the computer or other devices associated with the ports. These convenient interfaces, however, also provide an easy means for gaining unauthorized access to computers and other devices. A need exists for preventing unauthorized access to data ports and/or for providing evidence when a port has been accessed.

SUMMARY OF THE INVENTION

Briefly, the present invention discloses a port protector. The port protector provides a base member for engaging the port and a slide member that is slidably mounted to the base member thereby locking the port protector to the port. Removal of the port protector is accomplished by removing a tongue of the base member to disengage locking portions of the port protector. The removal of the tongue provides evidence of port access.

BRIEF DESCRIPTION OF THE DRAWINGS

The organization and manner of the structure and operation of the invention, together with objects and advantages thereof, may best be understood by reference to the following description, taken in connection with the accompanying drawings, wherein like reference numerals identify like elements in which:

FIG. 3b is a top-rear perspective view of the embodiment illustrated in FIG. 3a;

FIG. 3c is a top view of the embodiment illustrated in FIG. 3a;

FIG. 4b is a bottom view of the base member illustrated in FIG. 4a;

FIG. 4c is a side view of the base member illustrated in FIG. 4a;

FIG. 4d is an enlarged rear view of the base member illustrated in FIG. 4a;

FIG. 5b is a bottom view of the slide member illustrated in FIG. 5a;

FIG. 5c is a side view of the slide member illustrated in FIG. 5a;

FIG. 5d is a top-rear perspective view of the slide member illustrated in FIG. 5a;

FIG. 6c is a cross sectional view of the base member and slide member of the invention illustrated in FIGS. 3a-3c taken along line B-B of FIG. 6a;

FIG. 9b is a top-rear perspective view of invention illustrated in FIG. 9a;

FIG. 9c is a top view of the invention illustrated in FIG. 9a;

FIG. 10a is a bottom-rear perspective view of the base member of the port protector illustrated in FIGS. 9a-9d, the base member illustrated prior to folding;

FIG. 10b is a top view of the base member of FIG. 10a;

FIG. 10c is a bottom view of the base member of FIG. 10a;

FIG. 11b is a bottom view of the slide member illustrated in FIG. 11a;

FIG. 11c is a rear view of the slide member illustrated in FIG. 11a;

FIG. 11d is a top-rear perspective view of the slide member illustrated in FIG. 11a;

FIG. 11e is a top-front perspective view of the slide member illustrated in FIG. 11a;

DETAILED DESCRIPTION OF THE PREFERRED EMBODIMENT

Figure 1:
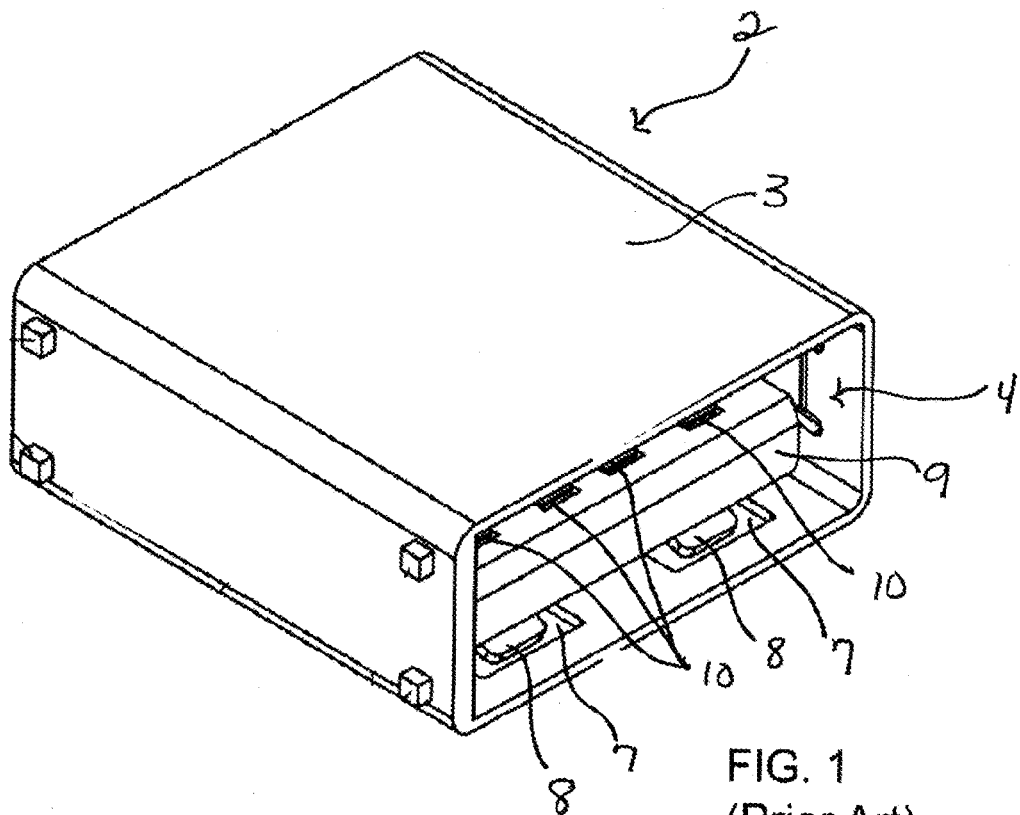
FIG. 1 is a perspective view of a prior art USB port.

While the invention may be susceptible to embodiment in different forms, there is shown in the drawings, and herein will be described in detail, a specific embodiments with the understanding that the present disclosure is to be considered an exemplification of the principles of the invention, and is not intended to limit the invention to that as illustrated and described herein.

The present invention provides a port protector that mounts to a port to inhibit access to the port thereby preventing use of the port for transmitting or receiving data. In the event access to the port is gained, the present invention provides evidence of such access. Examples of ports with which the invention may be used are illustrated in FIGS. 1 and 2.

FIG. 1 illustrates a USB-type port 2 such as those often associated with desktop and laptop computers, for example, and used to receive USB connectors. The port 2 provides a wall 3 defining a cavity 4 for receiving a USB connector (not shown). A rear surface 5 of the wall 4 is provided at the rear of the USB port 2. The wall 3 further defines spring apertures 7 and associated spring members 8. The apertures 7 and spring members 8 are designed to receive and engage features of the USB connector to be received within the port cavity 4 thereby securing the connector within the cavity 4. The port 2 may includes apertures 7 and spring members 8 located on the top and bottom surfaces of the port as illustrated in FIG. 1 or may include apertures 7 and spring members 8 located on a single surface. A bridge 9 is positioned within the port cavity 4. The bridge member 9 includes contact members 10 which engage contact members on the connector to be inserted in the cavity 4 allowing electrical communication between the connector and the device including the port 2.

Figure 2:
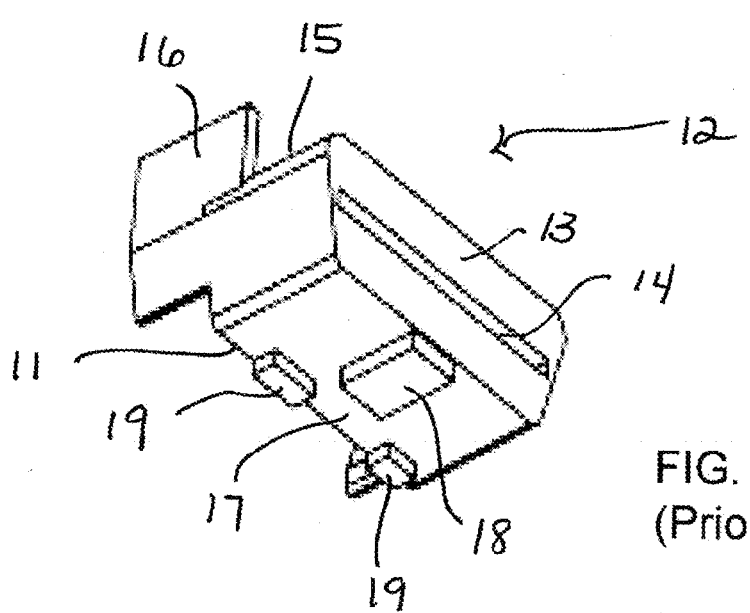
FIG. 2 is a perspective view of a prior art on-board diagnostic port.

FIG. 2 illustrates an on-board diagnostic type port 12 such as those found in vehicles, for example, and used to receive the connector of a diagnostic tool. A cavity 14 of the port 12 is configured to receive an on-board connector and is generally defined by a front wall 11, an opposite rear wall 13, a top wall 15 and an opposite bottom wall 17. The bottom wall 17 includes a rearward port foot 18 and forward port feet 19. The on-board connector (not shown) is received within the port cavity 14 thereby securing the connector within the cavity 14. Extensions 16 are used to mount the port to, for example, a vehicle. The port 12 includes contact members (not shown) which engage contact members on the connector to be inserted in the cavity 14 allowing electrical communication between the connector and the device including the port 12.

In the embodiments illustrated in the figures, representations of directions such as up/upper, down/lower, left, right, front/forward and rear/rearward used for explaining the device and movement of various elements of the device are not absolute but are relative. These representations are appropriate when the elements are in the position shown in the figures and are not intended to limit the invention. If the description of the position of the elements changes, these representations are to be changed accordingly.

A port protector 20 of the invention illustrated in FIGS. 3-8 is configured for use in connection with the USB port illustrated in FIG. 1, for example. A port protector 200 in accordance with another embodiment of the invention is illustrated in FIGS. 9-13 and is configured for use in connection with the on-board port illustrated in FIG. 2, for example.

Figure 3A:
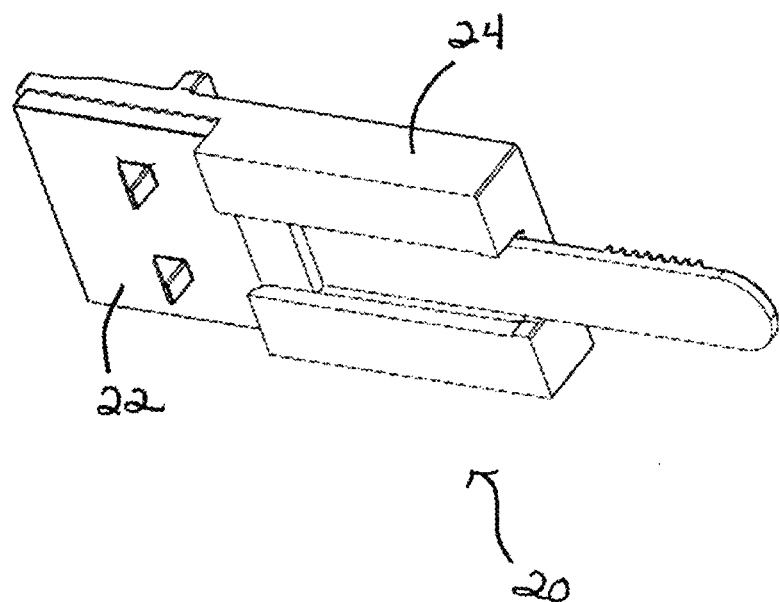
FIG. 3a is a bottom-rear perspective view of an embodiment of the present invention.
Figure 3B:
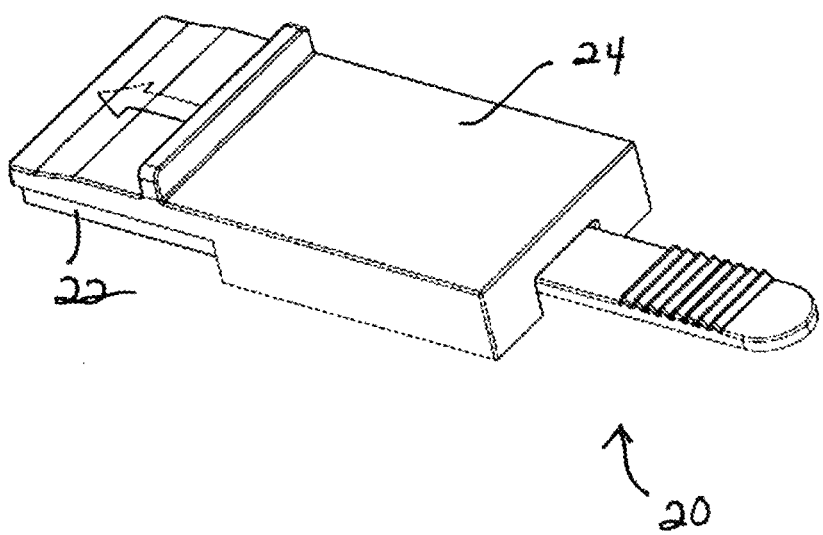
Figure 3C:
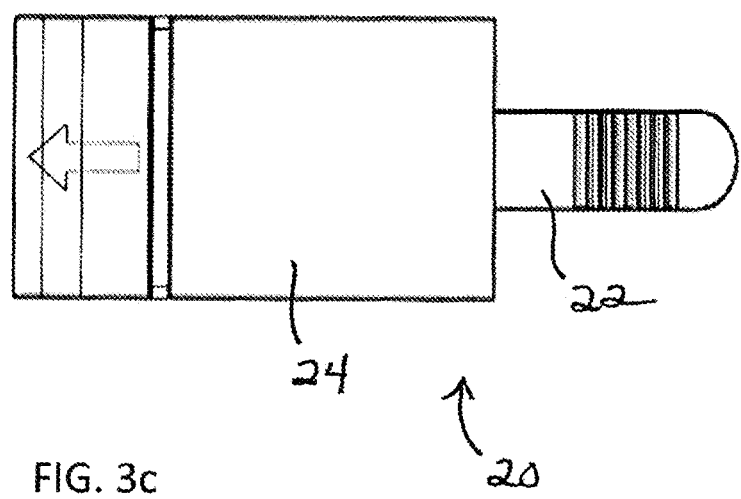

The port protector 20 of the present invention is illustrated in FIGS. 3a-3c and generally includes a base member 22 and a slide member 24 slidably mounted to the base member 22 as will be described in detail below.

Figure 4A:
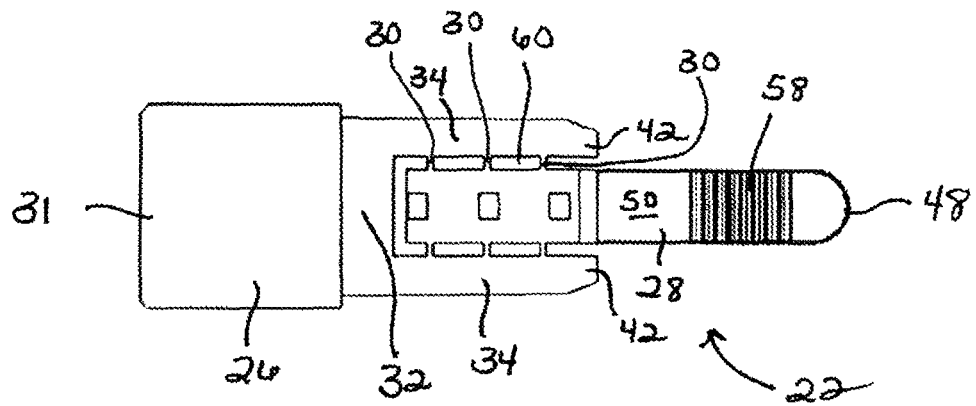
FIG. 4a is a top view of the base member of the invention illustrated in FIGS. 3a-3c.
Figure 4B:
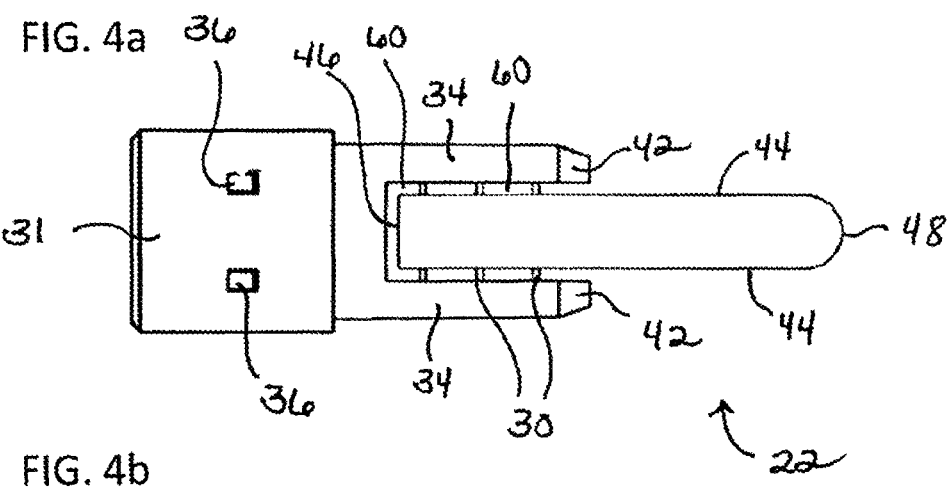
Figure 4C:
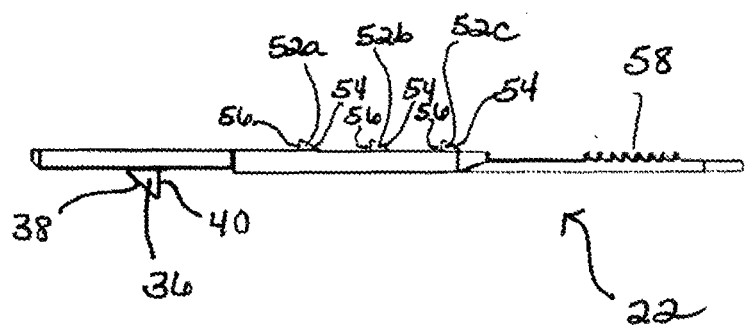
Figure 4D:
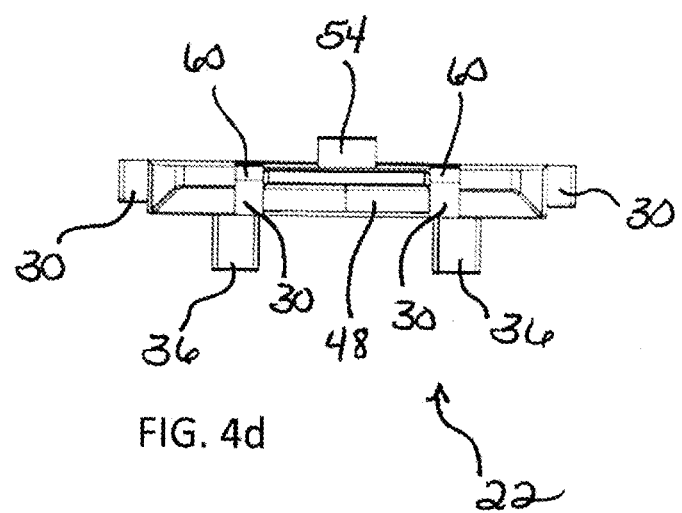

FIGS. 4a-4d illustrate the base member 22 of the port protector 20. The base member 22 is generally planar and includes a port engagement portion 26, a tongue 28, and frangible members 30. The base member 22 may be unitarily formed for example, by molded plastic, such as for example polycarbonate, or other suitable material The port engagement portion 26 generally includes a nose 31 positioned at the front end of the port engagement portion 26, a shoulder 32 abutting the nose 31, and arms 34 extending rearward of the shoulder 32. As best illustrated in FIGS. 4b, 4c and 4d, the port engagement portion 26 of the base member 22 includes a pair of spaced downwardly extending teeth 36. As best illustrated in FIG. 4c, each tooth 36 includes an inclined surface 38 and a catch surface 40 positioned rearward of the inclined surface 38.

As noted above, the shoulder 32 abuts the nose 31 of the port engagement portion 26. The rearwardly extending arms 34 are spaced from one another and extend rearward of the shoulder 32. Each arm 34 provides a free end 42 having a tapered end surface.

The tongue 28 is positioned between and spaced from the arms 34 and is spaced from the shoulder 32. The tongue 28 is generally planar and includes opposite first and second side walls 44, an end wall 46, and a free end 48. An upper surface 50 of the tongue 28 includes lower locking members 52a, 52b, 52c. As best shown in FIG. 4c, the lower locking members 52 may be provided by locking teeth. Each locking tooth 52a, 52b, 52c includes an inclined surface 54 and a catch surface 56 forward of the inclined surface 54. The upper surface 50 of the tongue 28 further includes a tread 58. The tread 58 is spaced rearward of the lower locking members 52a, 52b, 52c.

A relief 60 is provided between the arms 34 and the first and second side walls 44 of the tongue 28 and between the shoulder 32 and the end wall 46 of the tongue 28. The frangible members 30 extend from the arms 34 to the tongue 28 to support the tongue 28.

Figure 5A:
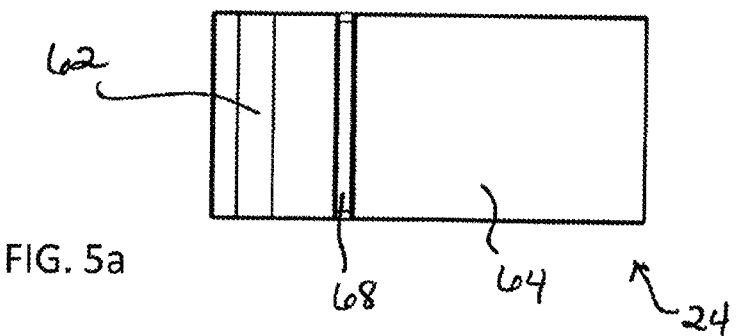
FIG. 5a is a top view of the slide member of the invention illustrated in FIGS. 3a-3c.
Figure 5B:
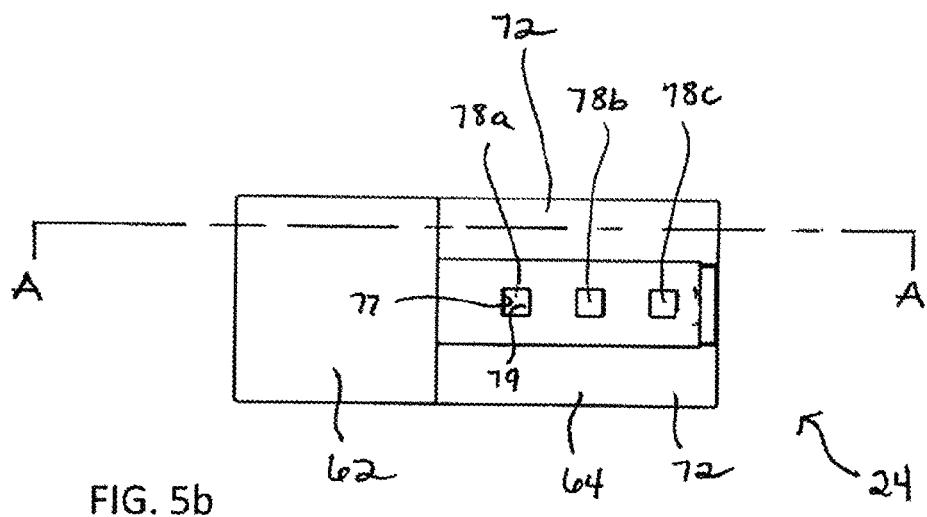
Figure 5C:
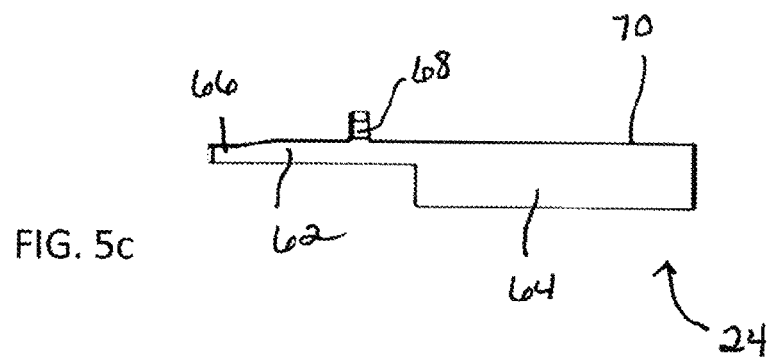
Figure 5D:
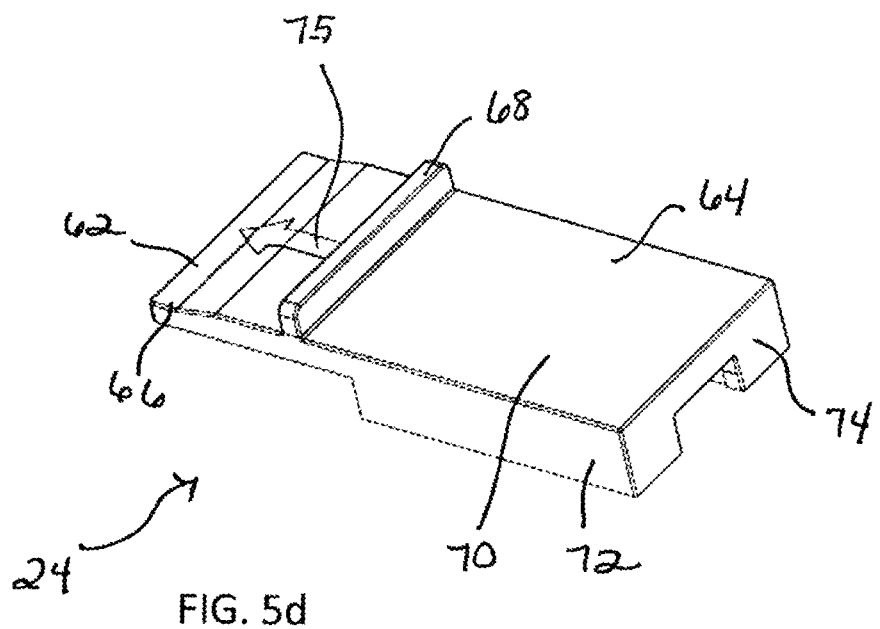
Figure 5E:
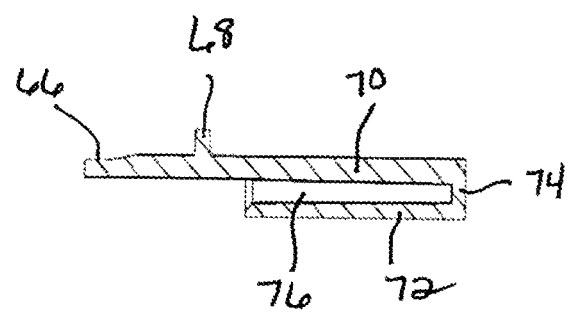
FIG. 5e is a cross-sectional view of the slide member taken along line A-A of FIG. 5b.

The slide member 24 is illustrated in FIGS. 5a-5e. The slide member 24 generally includes a nose 62 and a locking portion 64 extending rearwardly from the nose 62. The slide member 24 may be unitarily formed for example, by molded plastic, such as for example polycarbonate, or other suitable material. As best illustrated in FIGS. 5c-5e, the nose 62 of the slide member 24 is generally planar shaped and includes a tapered front end 66. A port barrier 68 extends from the upper surface of the nose 62.

Figure 7A:
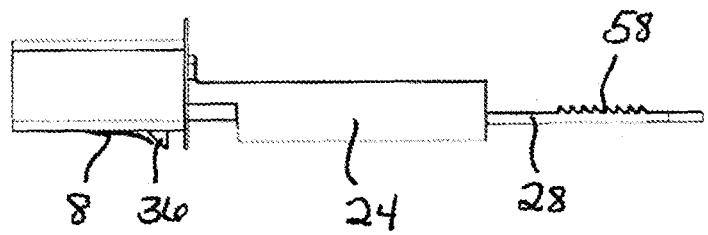
FIG. 7a is a side view of the invention illustrated in FIGS. 3a-3c in a locked position mounted in a USB port.

As best illustrated in FIGS. 5b and 5e, the locking portion 64 generally includes a top member 70, first and second tracks 72 spaced from the top member 70, and an end wall 74. The end wall 74 is generally U-shaped and is provided at the rear end of the slide member 24. As best illustrated in FIG. 5e, each track 72 along with the top member 70 and end wall 74 defines a channel 76. The locking portion 64 further includes upper locking members 78a, 78b, and 78c. As illustrated in FIG. 7c, and as will be described in further detail below, the upper locking members 78a, 78b, 78c of the slide member 24 are provided by cavities spaced and configured to receive the lower locking members 52a, 52b, 52c of the base member 22. Each upper locking member 78a, 78b, 78c includes a front/locking wall 77 and a rear wall 79. The front and rear walls 77, 79 are generally perpendicular to the upper and lower surfaces of the slide member 24.

Use of the port protector 20 with a port 2 will now be described. Installation of the port protector 20 in the port 2 begins by positioning the base member 22 in the port. More specifically, the nose 31 of port engagement portion 26 of the base member 22 is inserted in the port 2 such that the nose 31 is positioned within the port cavity 4 and the port teeth 36 engage the port springs 8 causing the springs 8 to deflect downward as illustrated in FIGS. 7a and 7c. At this point, the base member 22 can be freely inserted and removed from the port 2 simply by lifting the base portion 22 to clear the port teeth 36 from the port 2.

Figure 6A:
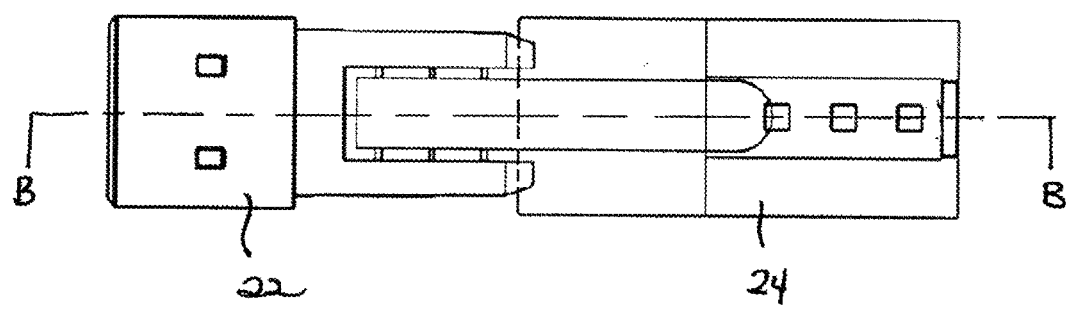
FIG. 6a is a bottom view of the base member and the slide member of the invention illustrated in FIGS. 3a-3c in a partially engaged position.
Figure 6B:
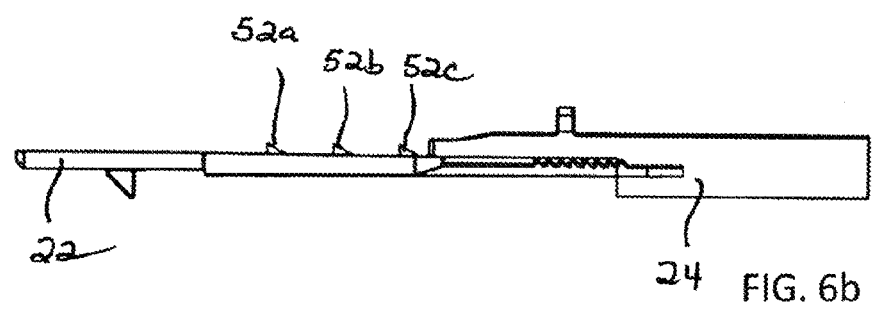
FIG. 6b is a side view of the base member and the slide member of the invention illustrated in FIGS. 3a-3c in a partially engaged position.
Figure 6C:
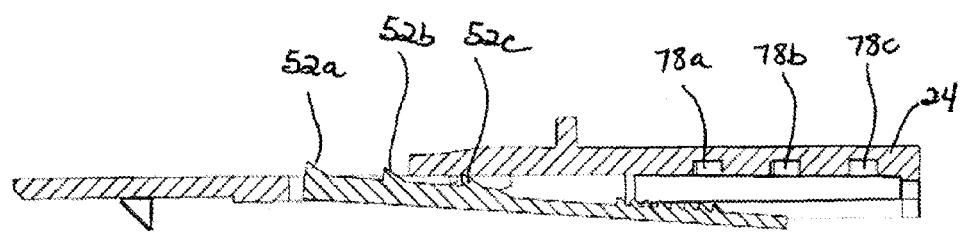

Slidable engagement is provided between said base member 22 and said slide member 24. The slide member 24 is mounted to the base member 22 by placing the nose 62 of the slide member 24 over the tongue 28 of the base member 22 and sliding the slide member 24 in the direction of the arrow 75 of FIG. 5d and toward the port 2 (i.e. forward). As illustrated in FIG. 6a-6c, as the user continues to advance the slide member 24, the nose 62 extends over the free ends 42 of the arms 34 of the base member 22, the free end 48 of the tongue 28 of the base member 22 is positioned between the tracks 72 of the slide member 24. As the user continues to advance the slide member 24, the free ends 42 of the arms 34 of the base member 22 are positioned at the front end of the channels 76 and the teeth 52a, 52b, 52c on the upper surface of the tongue 28 engage the lower surface of the slide member 24. As the user continues to advance the slide member 24 yet further, contact between the slide member 24 and the lower locking portions or teeth 52a, 52b, 52c of the base member 22 causes the tongue 28 to deflect away from the slide member 24. Upon alignment between the first upper locking member 78a and the third lower locking member 52c, the lower locking member 52c will snap into engagement with the first upper locking member 78a. Engagement of the catch surface 56 of the lower locking member/tooth 52c with the front/locking wall 77 of the upper locking member/cavity 78a prevents the slide member 24 from sliding rearwardly relative to the base member 22. Continued forward sliding of the slide member 24 provides for engagement of the inclined surface 54 of third lower locking member 52c with the rearward cavity wall 79 of the first upper locking member 78a causing the tongue 28 to deflect away from the slide member 24 allowing the third lower locking member 52c to disengage from the first upper locking member 78a. The user continues to slide the slide member 24 toward the port 2 until the first lower locking member 52a is aligned with the first upper locking member 78a; the second lower locking member 52b is aligned with the second upper locking member 78b; and the third lower locking member 52c is aligned with the third upper locking member 78c. With each of the upper and lower locking members 52, 78 aligned, the catch surface 56 of each locking member 52 engages the forward/locking wall 77 of each upper locking member 78a, 78b, 78c thereby preventing the slide member 24 from sliding rearwardly relative to the base member 22 to provide a locked position of the port protector 20.

Figure 7B:
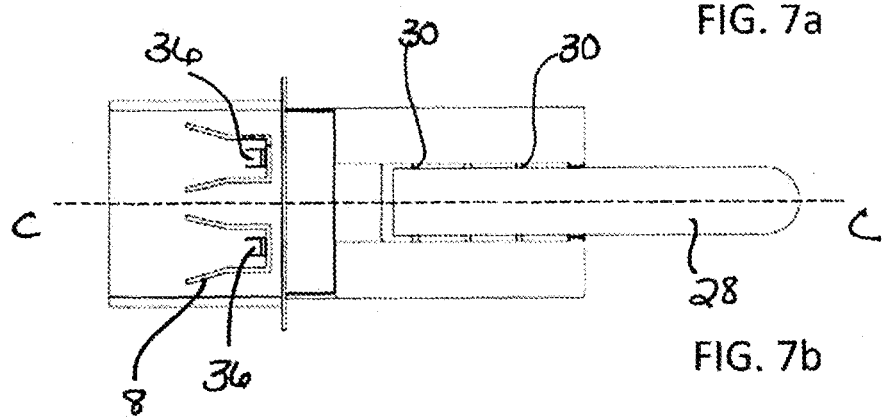
FIG. 7b is a bottom view of the invention illustrated in FIGS. 3a-3c in a locked position mounted in a USB port.
Figure 7C:
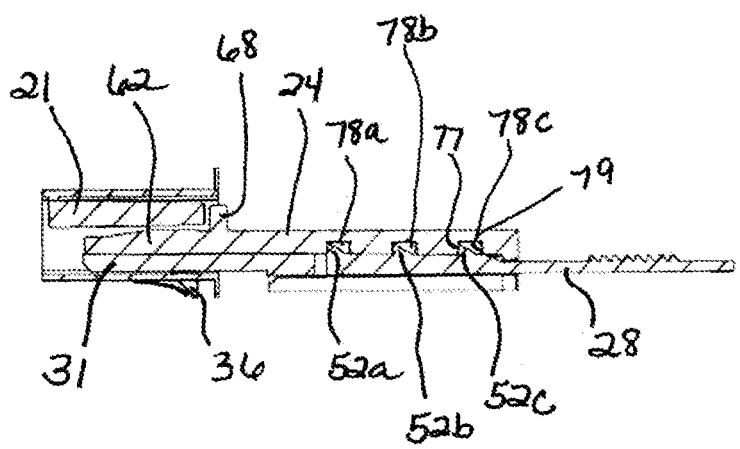
FIG. 7c is a cross-sectional view of the invention in a locked position mounted in a USB port taken along line C-C of FIG. 7b.
Figure 7D:
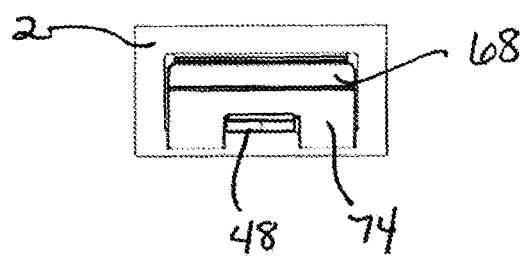
FIG. 7d is a rear view of the invention illustrated in FIGS. 3a-3c in a locked position mounted in a USB port.

FIGS. 7a-7d illustrate the port protector 20 mounted a port 2 in the locked position. In the locked position of the port protector 20, the arms 34 of the base member 22 reside in the channel 76 defined by the track 72 and the free ends 42 of the arms 34 abut the rear wall 74 of the slide member 24. As best illustrated in FIG. 7c, the nose 31 of the port engagement portion 26 of the base member 22 is positioned within the cavity 4 of the port 2 and the remainder of the base member 22 extends rearward of the port 2. The nose 62 of slide member 24 is also positioned within the port cavity 4 and abuts the nose 31 of the port engagement portion 26. The port barrier 68 of the slide member 24 engages the bridge 21 of the port 2. A portion of the tongue 28 extends rearward of the slide member 24 to expose the tread 58 of the tongue 28. As best illustrated in FIGS. 7b and 7c, when the port protector 20 is in the locked position, rearward movement of the port protector 20 is prevented due to the engagement of the port teeth 36 with the spring apertures 7. As best shown in FIGS. 7a and 7c, extension of the port teeth 36 through the spring apertures 7 causes downward deflection of the springs 8. Upward movement of the protector 20 is prevented due to the position of the slide member 24 within the port cavity 4. Specifically, the nose 62 of the slide member 24 abuts the bridge 21 within the cavity 4. Access to the port cavity 4 and any attempt to remove the port protector 20 from the port 2 is further inhibited by the port barrier 68.

When access to the port 2 is required, removal of the port protector 20 can be accomplished. Removal of the port protector 20 from the port 2 will however be evident. To remove the port protector 20 from the port 2, the user grips the tongue 28 at the tread 58 and pulls on the tongue 28 to break the frangible members 230 of the base 20, thereby perforating or removing the tongue 28 from the arms 34 of the port engagement portion 26 of the base member 22 and unlocking the port protector 20. As a result, the lower locking members 52a, 52b, 52c of the tongue 28 are no longer engaged with the upper locking members 78a, 78b, 78c and the slide member 24 is free to slide relative to the base member 22.

Figure 8A:
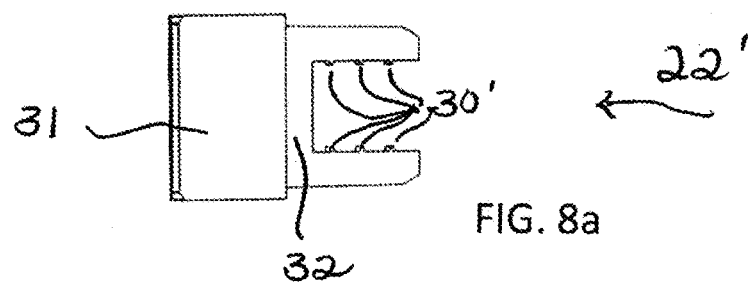
FIG. 8a is a top view of the base member illustrated in FIGS. 4a-4d with the tongue removed.
Figure 8B:
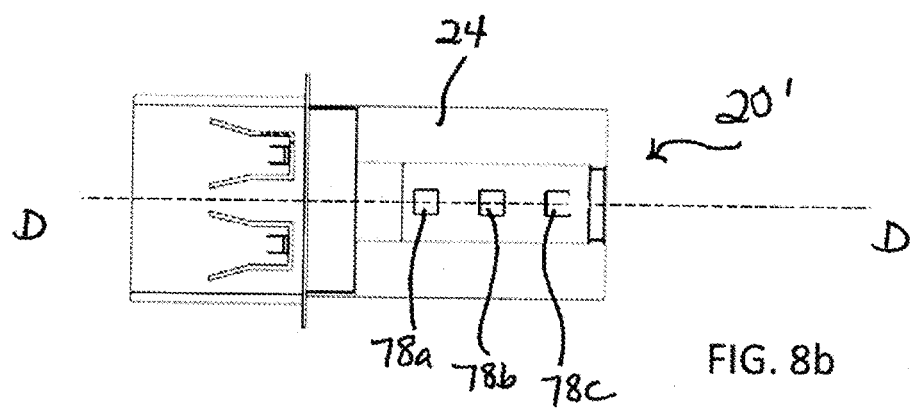
FIG. 8b illustrates a bottom view of the invention illustrated in FIG. 3a-3c mounted in a USB port with the tongue of the base member removed.
Figure 8C:
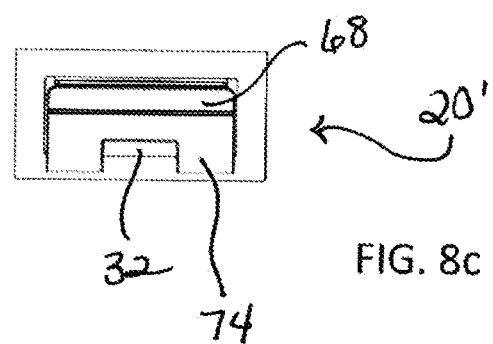
FIG. 8c illustrates a rear view of the invention illustrated in FIGS. 3a-3c mounted in a USB port with the tongue of the base member removed.
Figure 8D:
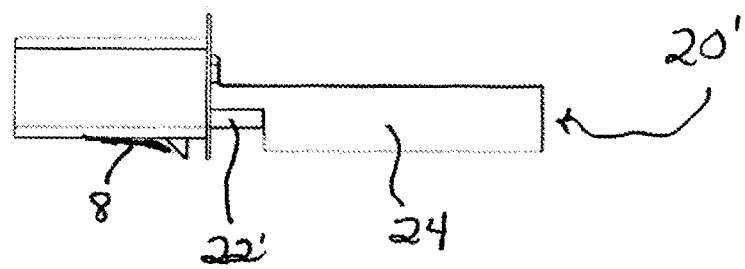
FIG. 8d illustrates a side view of the invention illustrated in FIGS. 3a-3c mounted in a USB port with the tongue of the base member removed.
Figure 8E:
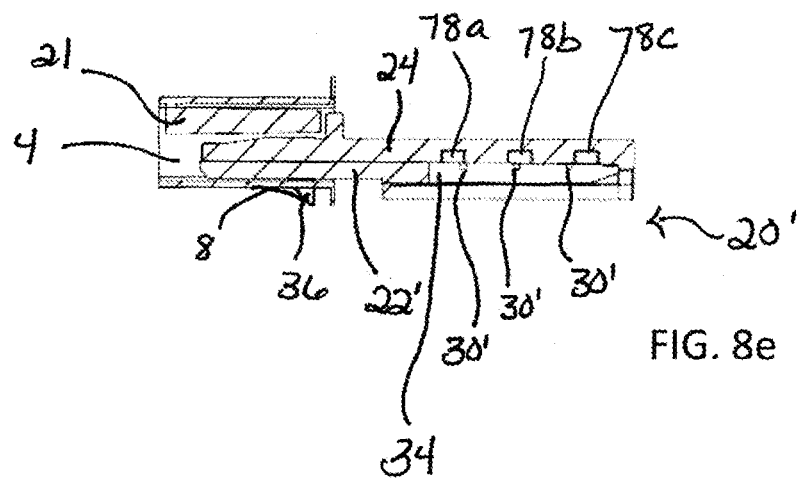
FIG. 8e illustrates a cross-sectional view of the invention illustrated in FIGS. 3a-3c mounted in a USB port with the tongue of the base member removed taken along line D-D of FIG. 8b.

FIG. 8a illustrates the remainder of the base portion 22' with the tongue 28 removed. Portions 30' of frangible members 30 of the base 22 remain after removal of the tongue 28. FIGS. 8b-8e illustrate the remaining portion 20' of the port protector 20 mounted in a port 2 after removal of the tongue 28. As illustrated in FIGS. 8b and 8e, with the tongue 28 removed, the upper locking members 78a, 78b, 78c are vacant. As best illustrated in FIG. 8e, with the tongue 28 removed, the slide member 24 is free to slide in the rearward direction relative to the base member 22'. Upon removal of the slide member 24, the base member 22' can be removed from the port 2 by simply lifting the base member 22' to clear the port teeth 36 from the port 2. With the port protector 20 removed a user is free to access the port 2, however, the removal of the port protector 20 from the port 2 provides evidence that access to the port 2 was accomplished. Even if repositioning of the port protector 20 is attempted, the tongue 28 cannot be remounted to the remainder of the base member 22'. Thus, the absence of the tongue 28 from the remainder of the port protector 20' provides evidence that access to the port 2 was accomplished. The use of a new port protector 20 to disguise evidence of access is deterred by providing a serial number or other unique identifier on the port protector 20 in order to distinguish a replacement port protector 20 from the original port protector 20.

Although the invention has been described as including three lower locking members 52a, 52b, 52c and three upper locking members 78a, 78b, 78c, it is to be understood that any number of locking members can be used including a single locking member. Further, although the lower locking members 52a, 52, 52c have been described as teeth and the upper locking members have been described as cavities, it is to be understood that the lower locking member could be provided by cavities and the upper locking member could be provided by teeth. In addition alternative locking members which restrict sliding movement of the slide member 24 relative to the base member 22 can be used.

Turning to the embodiment illustrated in FIGS. 9-13, the port protector 200 is provided for use in connection with the port 12. As illustrated in FIGS. 9a-9d the port protector 200 generally includes a base member 222 and a slide member 224 slidably mounted to the base member 222 as will be described in detail below.

Figure 10D:
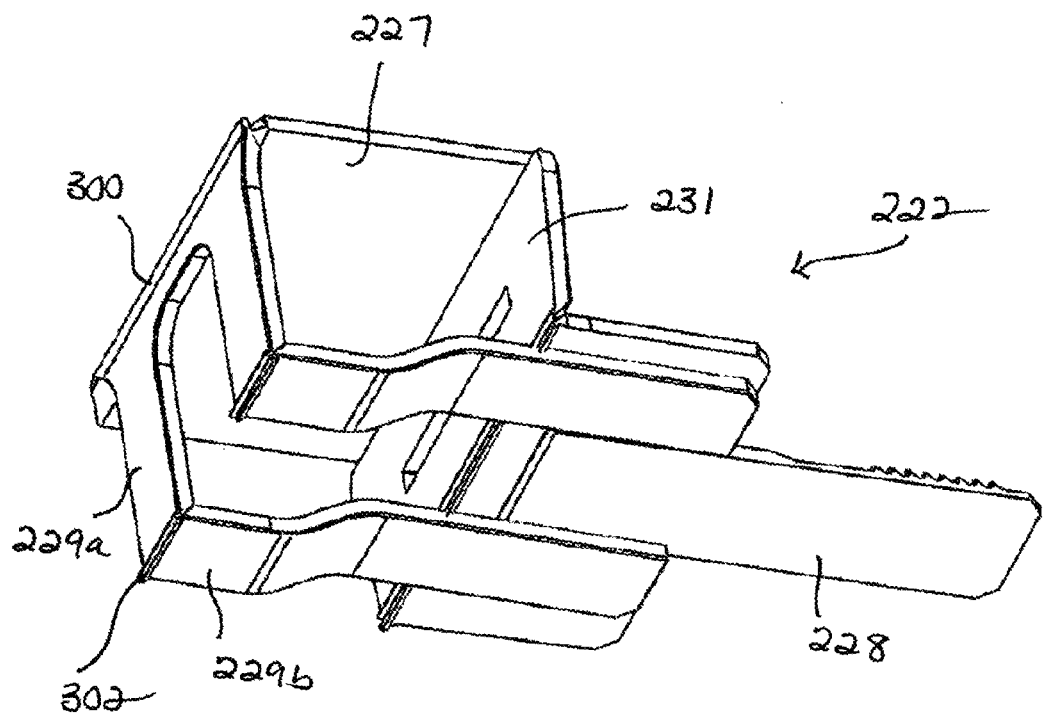
FIG. 10d is a bottom-front perspective view of the base member of FIG. 10a illustrated in the wrapped position.
Figure 10E:
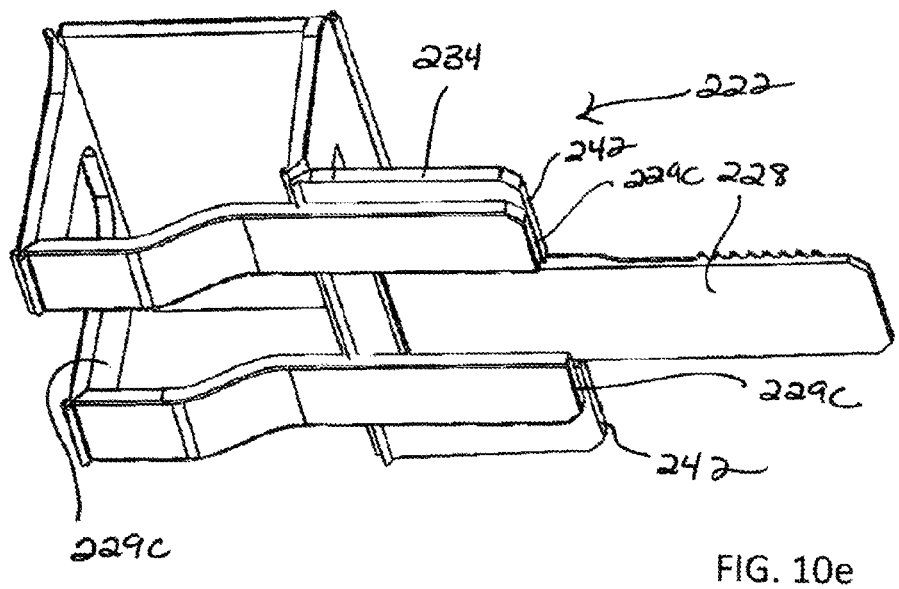
FIG. 10e is a bottom-rear perspective view of the base member of FIG. 10a illustrated in the wrapped position.
Figure 10F:
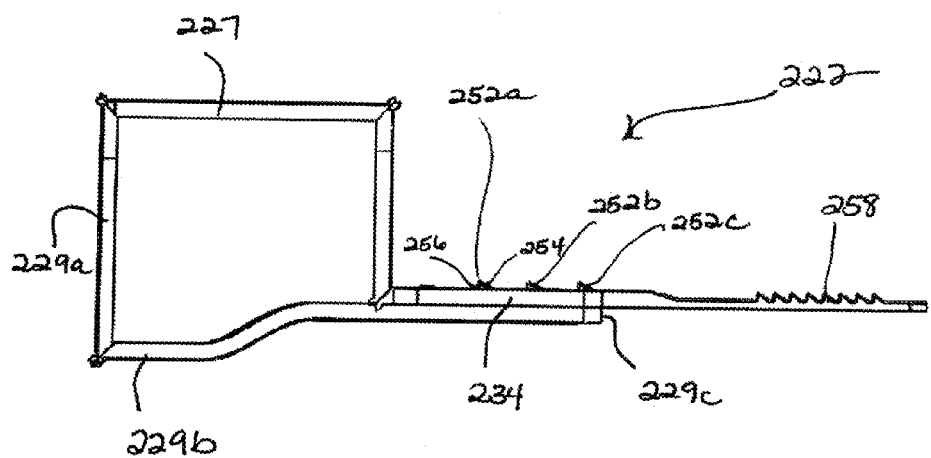
FIG. 10f is a side perspective view of the base member of FIG. 10a illustrated in the wrapped position.

FIGS. 10a-10e illustrate the base member 222 of the port protector 20. The base member 222 is first provided as a generally planar member as illustrated in FIGS. 10a-10c. When installed on the port 12 the base member 22 is folded around the port 12 and is positioned as illustrated in FIGS. 10d-10f.

The base member 222 generally includes a port engagement portion 226, a tongue 228, and frangible members 230. The base member 222 may be unitarily formed for example, by molded plastic, such as for example polycarbonate. Other suitable materials for forming the base member included for example, wood, metal, polystyrene, etc.

The port engagement portion 226 generally includes an upper wall 227, legs 229 a face 231, shoulder 232, and arms 234. The legs 229 extend rearwardly from the upper wall 227 and a fold line is provided between the upper wall 227 and leg 229. The face 231 extends forward of the upper wall 227 and a fold line 304 is provided between the upper wall 227 and the face 231. The legs 229 are spaced from one another and each leg 229 includes an upper leg portion 229a, a lower leg portion 229b and a free end 229c. A fold line 302 is provided between the upper portion 229a and the lower portions 229b of the legs 229. As shown in FIGS. 10a and 10b, the lower surface of each leg 229 includes a leg locking member 235 proximate the free end 229a of each arm 229. The leg locking members 235 can be, for example, a cavity. The face 231 includes a mouth 233. The shoulder 232 extends from the face 231 and the arms 234 extend rearward from the shoulder 232. A fold line 306 is provided between the face 231 and shoulder 232. The arms 234 are spaced from one another and each arm 234 includes a free end 242. As shown in FIGS. 10a and 10c, the lower surface of each arm 234 includes an arm locking member 241 proximate the free end 242. The arm locking members can be, for example, a protrusion.

The tongue 228 is positioned between and spaced from the arms 234 and is spaced from the shoulder 232. The tongue 228 is generally planar and includes opposite first and second side walls 244, an end wall 246, and a free end 248. An upper surface 250 of the tongue 228 includes lower locking members 252a, 252b, 252c. As best shown in FIG. 10f, the lower locking members 252a, 252b, 252c may be provided by locking teeth. Each locking tooth 252a, 252b, 252c includes an inclined surface 254 and a catch surface 256 forward of the inclined surface 254. The upper surface 250 of the tongue 228 further includes a tread 258. The tread 258 is spaced rearward of the lower locking members 252a, 252b, 252c.

A relief 260 is provided between the arms 234 and the first and second side walls 244 of the tongue 228 and between the shoulder 232 and the end wall 246 of the tongue 228. The frangible members 230 extend from the arms 234 to the tongue 228 to support the tongue 228.

The slide member 224 is illustrated in FIGS. 11a-11e. The slide member 224 generally includes a nose 262 and a locking portion 264. The slide member 224 may be unitarily formed for example, by molded plastic, such as for example polycarbonate, or other suitable material.

Figure 11A:
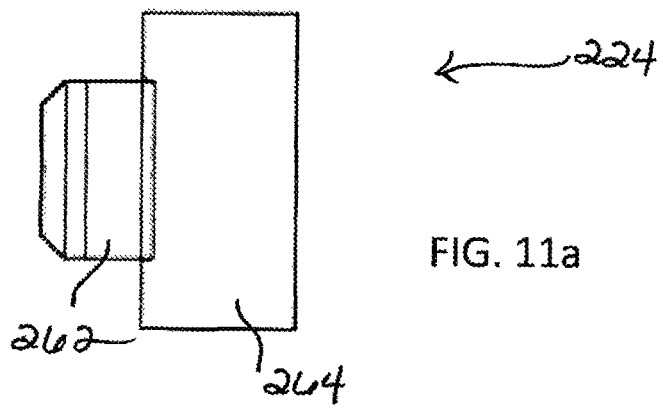
FIG. 11a is a top view of the slide member of the port protector illustrated in FIGS. 9a-9c.
Figure 11B:
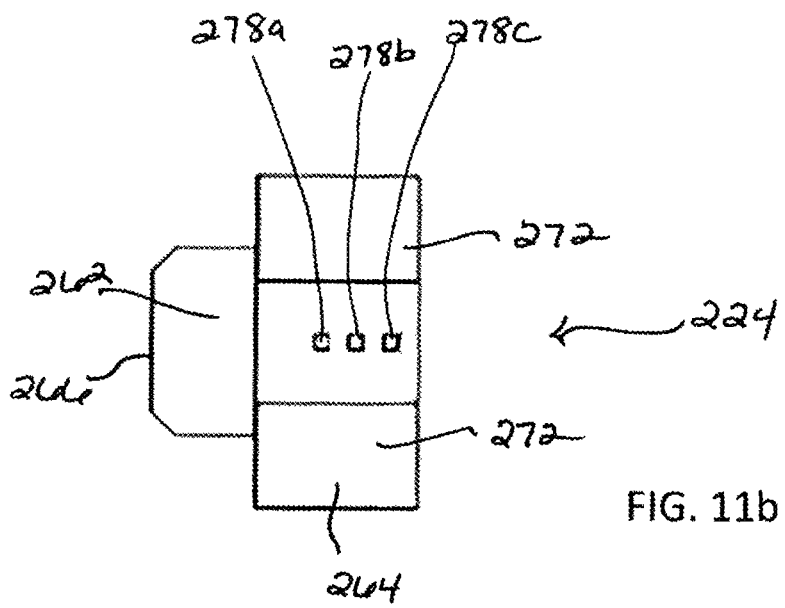
Figure 11C:
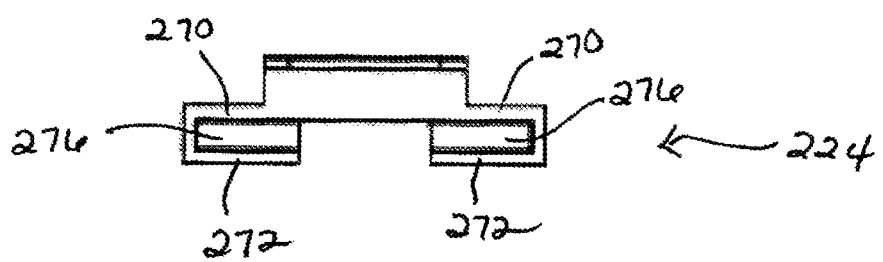
Figure 11D:
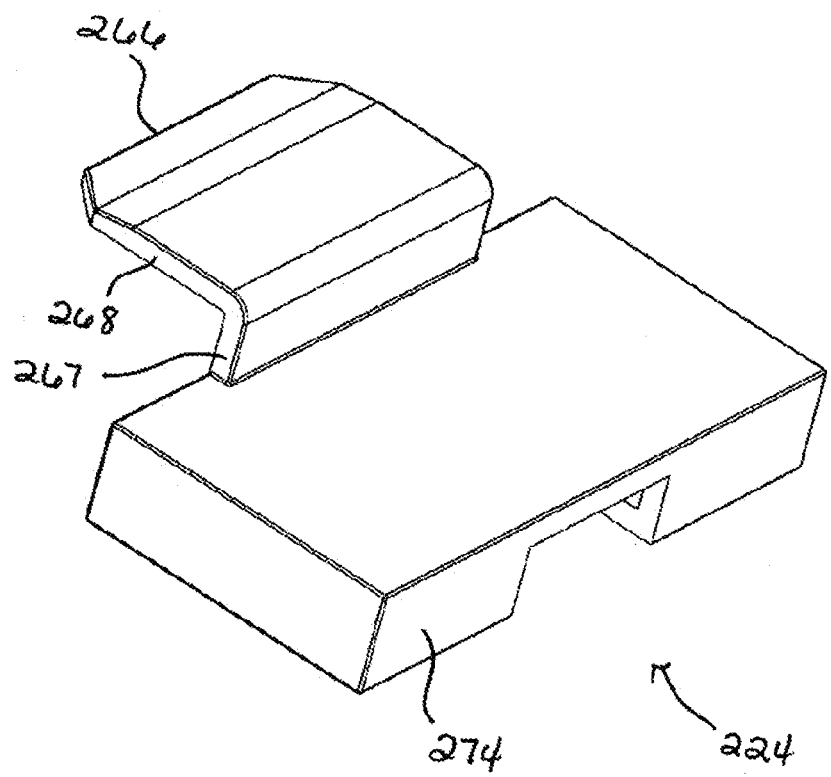
Figure 11E:
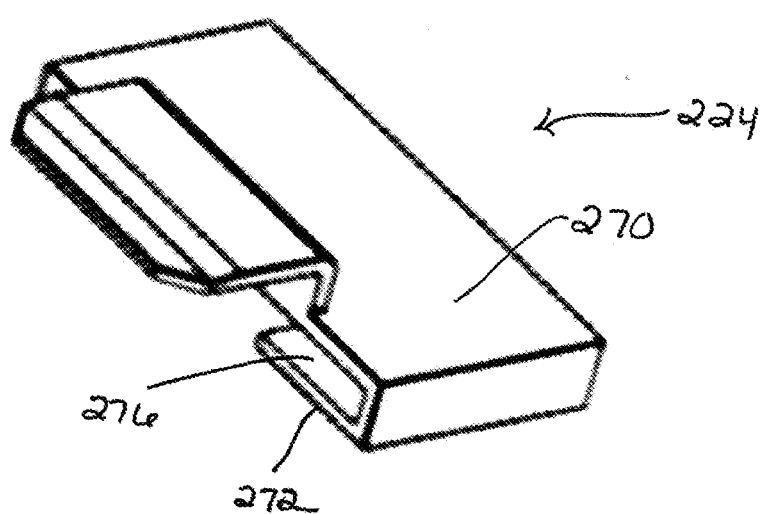

As best illustrated in FIGS. 11d-11e, the nose 262 of the slide member 224 is provided at the front end of the slide member 224. The nose 262 generally includes an upwardly extending portion 267 and a port barrier 268 extending from the upwardly extending portion 267, and a tapered free end 266.

Figure 9A:
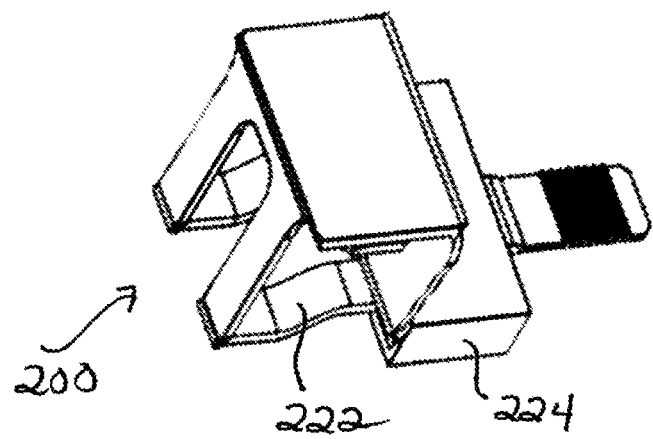
FIG. 9a is a top-front perspective view of an embodiment of the present invention in a locked position with the port removed.
Figure 9B:
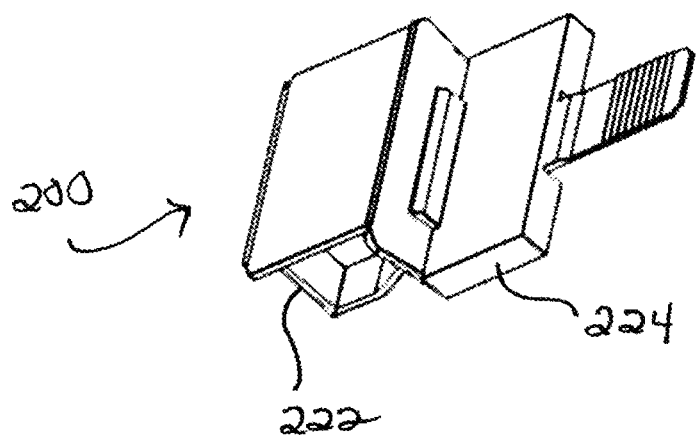
Figure 9C:
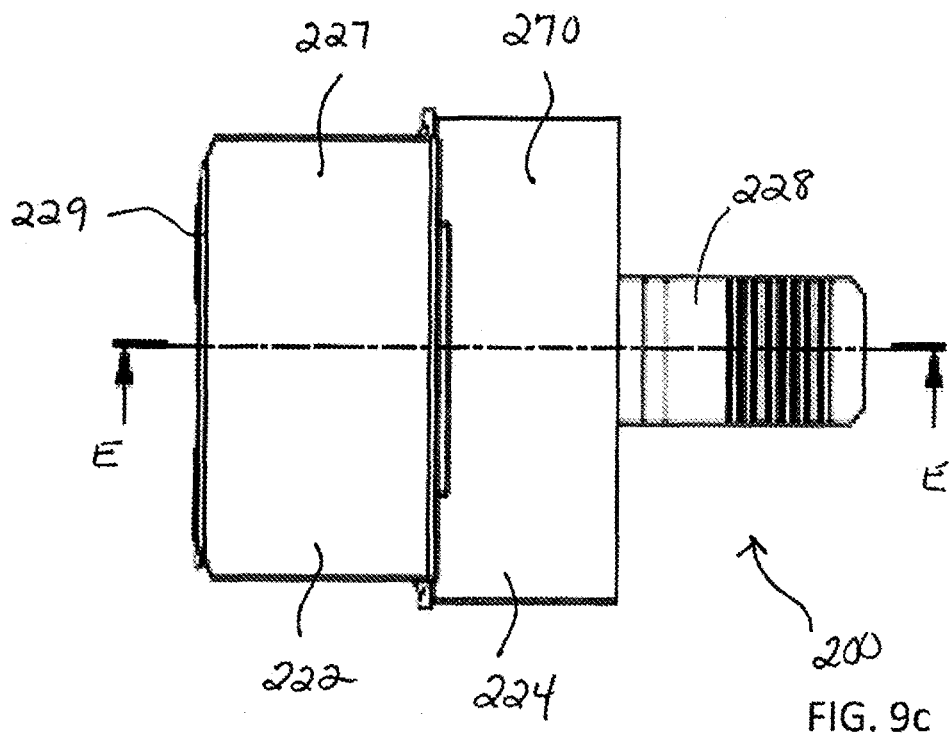
Figure 9D:
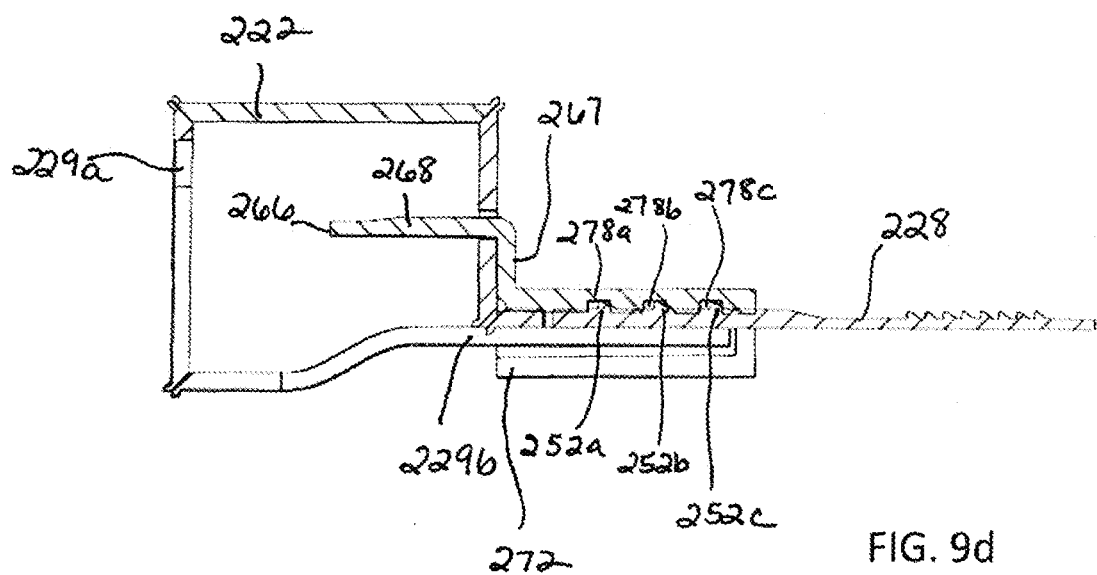
FIG. 9d is a cross-sectional view of the invention illustrated in FIG. 9a taken along line E-E of FIG. 9c.

The locking portion 264 of the slide member 224 extends rearward of the nose 262. The locking portion 264 generally includes a top member 270, first and second tracks 272 spaced from the top member 270, and an end wall 274 (see FIG. 11d). The end wall 274 is generally 1U-shaped and is provided at the rear end of the slide member 224. As best illustrated in FIGS. 11c and 11e, each track 272 along with the top member 270 and end wall 274 defines a channel 276. The locking portion 264 further includes upper locking members 278a, 278b, and 278c. As illustrated in FIG. 9d, and as will be described in further detail below, the upper locking members 278a, 278b, 278c of the slide member 224 are provided by cavities spaced and configured to receive the lower locking members 252a, 252b, 252c of the base member 222. Each upper locking member 278a, 278b, 278c includes a front/locking wall 277 and a rear wall 279. The front and rear walls 277, 279 are generally perpendicular to the upper and lower surfaces of the slide member 224.

Installation of the port protector 200 in the port 12 begins by wrapping the port engagement portion 226 of the base member 222 around the port 12 to engage the outer surfaces of the port 12. FIGS. 10d-10e illustrate the base member 222 in a wrapped position. For clarity the port 12 is not illustrated in FIGS. 10d-10e. Wrapping of the port engagement portion 226 begins by positioning the legs 229 of the port engagement portion 226 over the top surface 15 of the port 12 and sliding the base member 222 rearward until the upper wall 227 of the port engagement portion 226 is positioned over a top surface 15 of the port 12. Next the user positions a hand behind the port 12 and grasps the legs 229 causing the legs 229 to fold downward at fold line 300. With the legs folded at fold line 300 the upper leg portions 229a of the legs 229 are positioned forward of the front wall 11 of the port 12. Next, the user grasps the legs 229 and folds the legs 229 at fold lines 302 causing the lower portion 229b of legs 229 to be positioned under the bottom wall 17 of the port 12 with the free ends 229c of the legs 229 extending rearward of the port 12.

Next, the user folds the port engagement portion 226 of the base member 222 at fold line 304 causing the face portion 231 of the port engagement portion to be positioned rearward of the rear wall 13 of the port 12.

Next, the user folds the port engagement portion 226 of the base member 222 at fold line 306 causing the arms 234 of the base portion to extend at ninety degree (90°) angle relative to the face member 231 and rearward of the port 12.

With the base member 222 in the folded position, the lower portion 229b of the legs 229 will extend under the arms 234 of the base member 222 and the free ends 242 of the arms 234 will align with the free ends 229c of the legs 229. In addition, the lower portions 229b of the legs 229 will be positioned on opposite sides of the tongue 228. Furthermore, arm locking members 241 are engaged with the leg locking members 235. Although in the embodiment illustrated the leg locking members 235 and arm locking members 241 have a rectangular perimeter, it is understood, that these locking members could be any one of a variety of shapes. For example the perimeters of the locking member 235, 251 could be circular.

Next, slidable engagement is provided between said base member 222 and said slide member 224. The slide member 224 is mounted to the base member 222 by placing the nose 262 of the slide member 224 over the tongue 228 of the base member 222 and sliding the slide member 224 forward, i.e. toward the port 12. As the user continues to advance the slide member 224, the tongue 228 of the base member 222 is positioned between the channels 276 of the slide member 224. The user continues to advance the slide member 224 forward and the free ends 242 of the arms 234 and the free ends 229c of the legs 229 are positioned within the channels 276 of the slide member 224. As the user continues to advance the slide member 224 forward the nose 262 of the slide member 224 will pass through the mouth 233 of the face 231. Advancement of the slide member continues until the nose 262 abuts the face 231 of the base 222. Specifically, the upwardly extending portion 267 of the nose 262 abuts the face 231 of the port engagement portion 226 of the base 222 and/or until the free ends 242, 229c of the arms 234 and legs 229 abut the end wall 274 of the slide member 224.

As the slide member 224 is slid forward, i.e., toward the port 12, the teeth 252a, 252b, 252c on the upper surface of the tongue 228 engage the lower surface of the slide member 24. As the user continues to advance the slide member 224 yet further, contact between the slide member 224 and the lower locking portions or teeth 252a, 252b, 252c of the base member 222 will cause the tongue 228 to deflect away from the top member 270 of slide member 224. Upon alignment between the first upper locking member 278a and the third lower locking member 252c, the lower locking member 252c will snap into engagement with the first upper locking member 278a. Engagement of the catch surface 256 of the lower locking member/tooth 252c with the front/locking wall 277 of the upper locking member/cavity 278a prevents the slide member 224 from sliding rearwardly relative to the base member 222. Continued forward sliding of the slide member 226 provides for engagement of the inclined surface 252 of third lower locking member 252c with the rearward cavity wall 279 of the first upper locking member 278a causing the tongue 228 to deflect away from the top member 270 of the slide member 224 allowing the third lower locking member 252c to disengage from the first upper locking member 278a. The user continues to slide the slide member 226 toward the port 12 until the first lower locking member 252a is aligned with the first upper locking member 278a; the second lower locking member 252b is aligned with the second upper locking member 278b; and the third lower locking member 252c is aligned with the third upper locking member 278c. With each of the upper and lower locking members 252, 278 aligned, the catch surface 256 of each locking member 252 engages the forward/locking wall 277 of each upper locking member 278a, 278b, 278c thereby preventing the slide member 226 from sliding rearwardly relative to the base member 222 to provide a locked position of the port protector 220.

Figure 12:
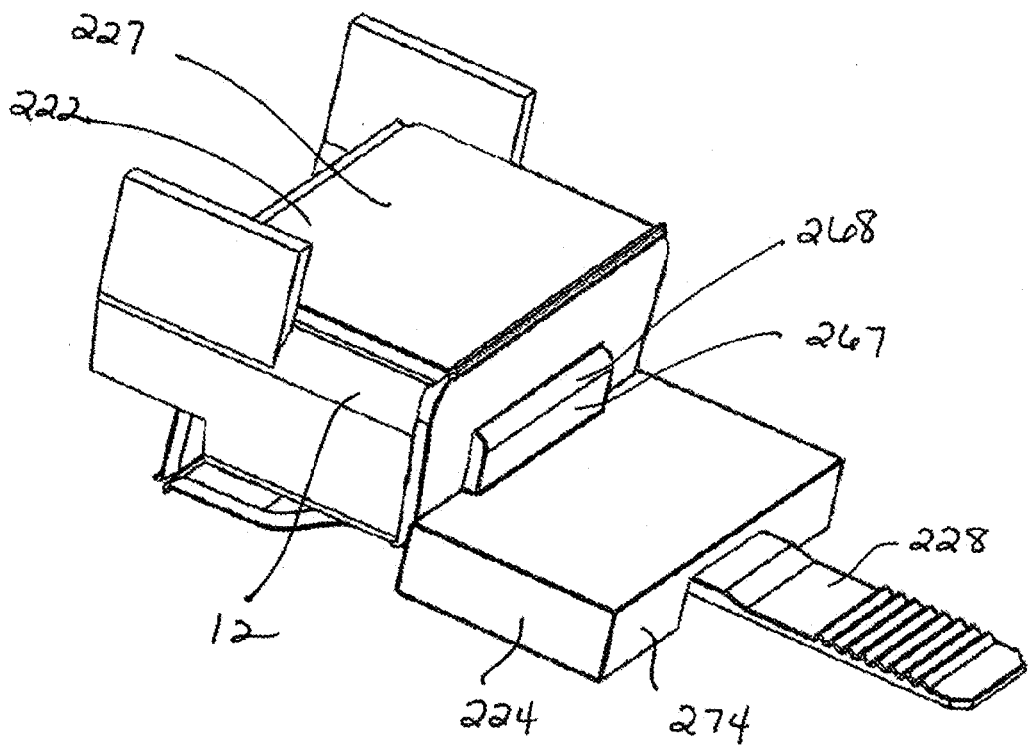
FIG. 12 is a top-rear perspective view of the port protector illustrated in FIGS. 9a-9c in a locked position and mounted to an on-board diagnostic port.

FIGS. 9a-9e and illustrates the port protector 200 mounted to a port 12 in the locked position with the port 12 removed for clarity. FIG. 12 illustrates the port protector 200 mounted to a port 12 in the locked position. In the locked position of the port protector 200, the arms 234 and lower legs 229b of the base member 222 reside in the channels 276 defined by the track 272 of the slide member 224. The legs 229b of the base portion are locked with the arms 234 of the base portion due to engaged locking members 235, 241 positioned within the slide member 224, thereby preventing the base member 222 from being "unwrapped" from the port 12. The slide member 224 is prevented from sliding rearwardly due to the engagement of the upper and lower locking members 252, 278.

Figure 13:
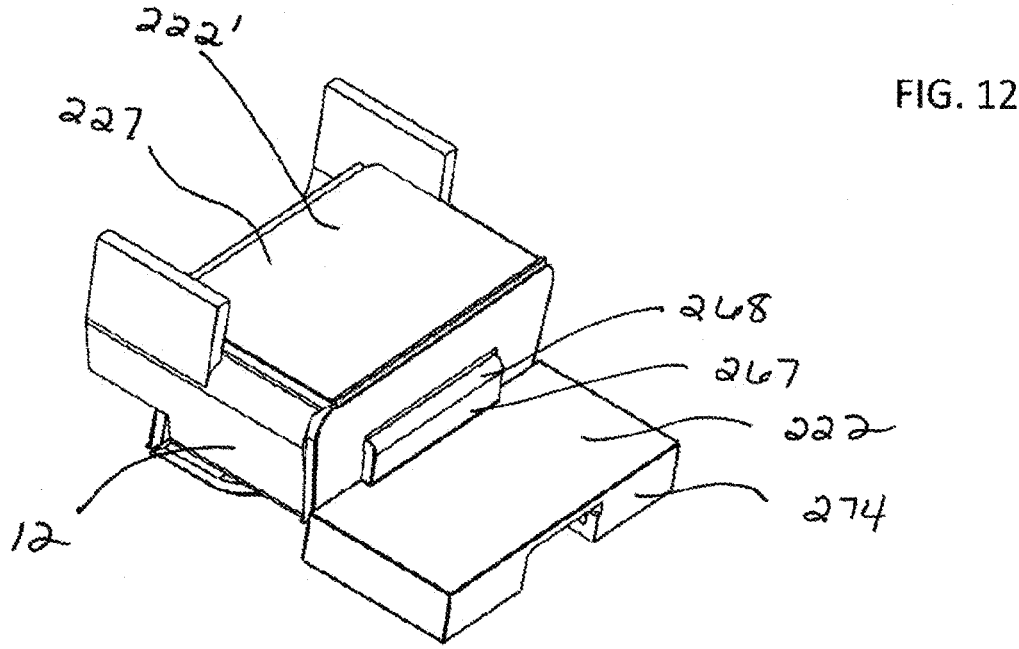
FIG. 13 is a top-rear perspective view of the port protector illustrated in FIGS. 9a-9c in an unlocked position and mounted to an on-board diagnostic port.

When access to the port 12 is required, removal of the port protector 200 can be accomplished. Removal of the port protector 200 from the port 12 will however be evident. FIG. 13 illustrates the port protector 200 mounted to the port 12 with the tongue 28 of the base member 222 removed or perforated. To unlock the port protector 200, the user grips the tongue 228 at the tread 258 and pulls on the tongue 228. As the user pulls the tongue 228 rearward, the base member remains secured to the port due to the contact between the walls 11, 13, 15, and 17 of the port 12 and the port engagement portion 226 of the base member. If sufficient force is applied to the tongue 228, the frangible members 230 of the base 222 will break, thereby perforating or removing the tongue 228 from the arms 234 of the port engagement portion 226 of the base member 222 and unlocking the port protector 200. With the tongue removed, the port protector 200 is in an "unlocked" condition and the lower locking members 252a, 252b, 252c of the tongue 228 are no longer engaged with the upper locking members 278a, 278b, 278c and the slide member 224 is free to slide relative to the remainder of the base member 222'.

Upon removal of the slide member 224, the remainder of the base member 222' can be removed from the port 12 by simply disengaging the locking members 235, 241 and unwrapping the remainder of the base member 222' from the port 12. With the port protector 200 removed, a user is free to access the port 12, however, the removal of the port protector 200 from the port 12 provides evidence that access to the port 12 was accomplished. Even if repositioning of the port protector 200 is attempted, the tongue 228 cannot be remounted to the remainder of the base member 222'. Thus, the absence of the tongue 228 from the remainder of the base 222' provides evidence that access to the port 12 was accomplished. The use of a new port protector 200 to disguise evidence of access is deterred by providing a serial number or other unique identifier on the port protector 200 in order to distinguish a replacement port protector 200 from the original port protector 200.

Although the invention has been described as including three lower locking members 252a, 252b, 252c and three upper locking members 278a, 278b, 278c, it is to be understood that any number of locking members can be used including a single locking member. Further, although the lower locking members 252a, 252, 252c have been described as teeth and the upper locking members have been described as cavities, it is to be understood that the lower locking member could be provided by cavities and the upper locking member could be provided by teeth. In addition, alternative locking member designs can be used.

While preferred embodiments of the present invention are shown and described, it is envisioned that those skilled in the art may devise various modifications of the present invention without departing from the spirit and scope of the appended claims.

The invention claimed is:

1. A port protector comprising:
a base member having, a port engagement portion, a tongue attached to said port engagement portion via a frangible member, the tongue including a lower locking member;
a slide member having a nose and an upper locking member configured to engage with said lower locking member; and wherein said slide member is slidably engaged with said base member, the port protector provides a locked position wherein said nose of said slide member abuts said port engagement portion and said upper locking member is engaged with said lower locking member to restrict said slide member from sliding relative to said base member, and removal of said tongue unlocks said port protector.

2. The port protector of claim 1 wherein said base member includes a port tooth for engaging the port.

3. The port protector of claim 2, wherein said port tooth engages a spring aperture of the port.

4. The port protector of claim 1, wherein said base member further includes arms and said slide member further includes tracks forming channels for receiving said arms.

5. The port protector of claim 1, further including a tread on said tongue.

6. The port protector of claim 1 wherein said base member includes, a port engagement portion configured to engage outer surfaces of the port.

7. The port protector of claim 6, wherein said base member includes a plurality of fold lines.

8. The port protector of claim 7, wherein said frangible members extend from said arms of said base member.

9. The port protector of claim 6, wherein said base member includes arms and legs and said slide member further includes tracks forming channels for receiving said arms and said legs.

10. The port protector of claim 9 wherein said arms further include arm locking members and said legs further include leg locking members for engaging said arm locking members.

11. The port protector of claim 9, wherein said slide member further includes an end wall blocking access to said channels.

12. The port protector of claim 1, wherein said slide member further include a port barrier.

13. The port protector of claim 12, wherein said port barrier abuts a bridge of the port.

14. The port protector of claim 12, wherein said base member includes a face having a mouth and said port barrier extends through said mouth into the port.

15. The port protector of claim 1, wherein said lower locking member is a tooth and said upper locking member is a cavity wall.

16. The port protector of claim 15, wherein said tooth includes an inclined surface and a catch surface and said catch surface of said tooth engages said cavity wall to restrict sliding of the slide member away from said port.

17. The port protector of claim 1, wherein removal of said tongue provides evidence of port access.

18. The port protector of claim 1, further including a unique identifier.

* * * * *